United States Patent [19]

Leavesley

[11] Patent Number: 5,231,831

[45] Date of Patent: Aug. 3, 1993

[54] TURBOCHARGER APPARATUS

[76] Inventor: Malcolm G. Leavesley, 54 Heylyn Square, Malmesbury Road, Bow, London E3 2DW, England

[21] Appl. No.: 992,263

[22] Filed: Dec. 14, 1992

Related U.S. Application Data

[63] Continuation-in-part of Ser. No. 922,343, Jul. 28, 1992, Pat. No. 5,214,920.

[51] Int. Cl.⁵ .......................................... F02D 23/00
[52] U.S. Cl. .................................... 60/602; 415/157; 415/158
[58] Field of Search ............... 415/157, 158; 60/600, 60/601, 602, 603

[56] References Cited

U.S. PATENT DOCUMENTS

| | | | |
|---|---|---|---|
| 2,739,782 | 3/1956 | White | 415/158 |
| 4,171,936 | 10/1979 | Hageman | 60/602 |
| 4,324,526 | 4/1982 | Berchtold | 415/158 |
| 4,378,194 | 3/1983 | Bandukwalla | 415/158 |
| 4,802,817 | 2/1989 | Tyler | 415/157 |
| 4,886,416 | 12/1989 | Wunderlich | 415/158 |
| 5,169,286 | 12/1992 | Yamada | 415/157 |

Primary Examiner—Richard A. Bertsch
Assistant Examiner—Peter Korytnyk
Attorney, Agent, or Firm—Iandiorio & Dingman

[57] ABSTRACT

Variable turbocharger apparatus (2) comprising a compressor housing (64), a compressor (6) mounted for rotation in the housing (64), a turbine housing (4), a turbine (12) mounted for rotation in the housing (4), a first inlet (16) for enabling air to be conducted to the compressor (6), an outlet (18) for air from the compressor (6), a second inlet (20) for enabling exhaust gases from an engine to be conducted to the turbine (12), a chamber (22) which surrounds the turbine (12) and which receives the exhaust gases from the second inlet (20) before the exhaust gases are conducted to the turbine (12), a piston (24) which is positioned between the turbine (12) and the housing (4) and which is slidable backwards and forwards to form a movable wall separating the turbine (12) from the chamber (22) which surrounds the turbine (12), a bearing assembly (68) for allowing the rotation of the compressor (6) and the turbine, and a heat shield (201) for shielding the bearing assembly (68) from the exhaust gases, and the piston (24) having a plurality of vanes (102) which enter into slots (260) in the heat shield (201).

11 Claims, 13 Drawing Sheets

TURBOCHARGER APPARATUS

This application is a continuation-in-part application based on U.S. Ser. No. 07/922,343, filed Jul. 28, 1992, entitled "Turbocharger Apparatus", by Malcolm G. Leavesley, now U.S. Pat. No. 5,214,920.

BACKGROUND OF THE INVENTION

This invention relates to turbocharger apparatus and it relates more especially to variable turbocharger apparatus.

Different types of turbocharger apparatus are known. One known type of turbocharger apparatus comprises a housing, a compressor mounted for rotation in the housing, a turbine mounted for rotation in the housing, a first inlet for enabling air to be conducted to the compressor, an outlet for air from the compressor, a second inlet for enabling exhaust gases from an engine to be conducted to the turbine, and a chamber which surrounds the turbine and which receives the exhaust gases from the second inlet before the exhaust gases are conducted to the turbine. This known type of turbocharger apparatus is such that there is a fixed gap through which the exhaust gases in the chamber can pass to the turbine. The size of this gap is chosen to be a compromise between the various different sizes of gap that are ideally required for different engine operating conditions. This means that, for most engine operating conditions, the gap is not exactly correct and the turbocharger apparatus thus operates at less than its optimum performance. For example, with a relatively small gap, the turbocharger apparatus gives a quick response but excessive pressure tends to build up in the chamber. With a large gap, the build up of excessive pressure in the chamber is avoided but then the response time of the turbine apparatus is slow.

SUMMARY OF THE INVENTION

It is an aim of the present invention to obviate or reduce the above mentioned problem.

Accordingly, this invention provides variable turbocharger apparatus comprising a compressor housing, a compressor mounted for rotation in the compressor housing, a turbine housing, a turbine mounted for rotation in the turbine housing, a first inlet for enabling air to be conducted to the compressor, an outlet for air from the compressor, a second inlet for enabling exhaust gases from an engine to be conducted to the turbine, a chamber which surrounds the turbine and which receives the exhaust gases from the second inlet before the exhaust gases are conducted to the turbine, a piston which is positioned between the turbine and the turbine housing and which is slidable backwards and forwards to form a movable wall separating the turbine from the chamber which surrounds the turbine, a bearing assembly for allowing the rotation of the compressor and the turbine, and a heat shield for shielding the bearing assembly from the exhaust gases, the piston having a plurality of vanes, the piston being such that in its closed position it terminates short of an adjacent part of the housing so that there is always a gap between the end of a piston and the adjacent part of the housing whereby exhaust gases from the chamber can always pass through the gap to act on the turbine, the piston being such that in its open position the gap is increased, and the piston being biased to its closed position against pressure from exhaust gases in the chamber during use of the variable turbocharger apparatus whereby the piston slides backwards and forwards to vary the gap in dependence upon engine operating conditions, and the variable turbocharger apparatus being such that the vanes on the piston enter into slots in the heat shield.

The heat shield enables parts of the turbocharger apparatus to rotate such that an oil outlet of the turbocharger apparatus is always pointing vertically downwards. This gives a good gravity feed of oil back to the engine.

Preferably, the heat shield forms a chamber into which the vanes on the piston project, the chamber being sealed so as to prevent gas leakage to a low pressure side of the turbine. The chamber makes the heat shield very effective at stopping heat passing to the low pressure side of the turbine apparatus.

The vanes may project through slots in a front face of the heat shield. Such an arrangement is advantageous in that the vanes are always in the gas flow to direct the gases at an appropriate angle onto the turbine.

The variable turbocharger apparatus may include fork means which engages in a groove in the piston. The fork means enables the piston to be moved backwards and forwards in an axial direction without forcing the piston to one side and thus causing it to bind in the variable turbocharger apparatus.

Preferably, the piston comprises a cylindrical body portion having the groove provided at that end of the body portion remote from the gap.

The piston will usually be arranged to slide in a cylindrical part of the turbine housing.

Preferably, the fork means is located on a shaft that is mounted in the housing. The shaft may be connected to an actuator valve which enables movement to be applied to the fork means.

The fork means is preferably a bifurcated fork but other types of fork means may be employed.

The variable turbocharger apparatus may include an air bleed passage which leads from the outlet for air from the compressor to the actuator valve, the air bleed passage enabling air to be directed against a diaphragm in the actuator valve in order to cause movement of the actuator valve, whereby movement of the actuator valve can be transmitted to the fork means and the piston in dependence upon air bleed pressure. The air bleed pressure will usually be dependent upon the speed of rotation of the compressor.

As an alternative to using air which is bled from the compressor, a separate air supply may be used. Thus, for example, the separate air supply may be provided by a small separate electronic compressor. Also, microprocessors can be used to monitor a selected parameter or parameters and to compute the position of the piston to give the required piston position.

The variable turbocharger apparatus may be one in which the piston is provided with a lug which engages a pin for preventing rotation of the piston.

Usually, the piston will be spring biased to its closed position. Preferably, the piston is spring biased to its closed position by a single coil spring. Advantageously, the single coil spring is axially positioned inside the actuator valve. In alternative embodiments of the variable turbocharger apparatus, more than one spring may be employed. Also, if desired, biasing means other than springs may be employed.

The variable turbocharger apparatus may include sealing means for forming a sliding seal between the piston and the housing. The sealing means may comprise at least one sealing piston ring.

Preferably, only one sealing piston ring is employed but more than one sealing piston ring may be employed if desired. The or each sealing piston ring may be located in a cylindrical body portion of the piston. Alternatively, the or each sealing piston ring may be mounted in the turbine housing.

The end of the piston adjacent the gap may be chamfered. This chamfered end of the piston may help to prevent the build up of products of combustion at this point with some types of engine, for example 2- and 4-stroke petrol driven engines.

If desired, the variable turbocharger apparatus may include at least one bearing against which the sealing means slides backwards and forwards. When a bearing is employed, it is preferred that the bearing be located in the housing adjacent the cylindrical body portion of the piston.

Advantageously, the compressor housing and the turbine housing are formed as separate parts. This may facilitate assembly of the variable turbocharger apparatus and it may also facilitate fixing of the variable turbocharger apparatus in various engine compartments of various vehicles.

The variable turbocharger apparatus may advantageously include a chamber in which the fork means locates, the piston being such as to cover the chamber to prevent a heat build-up on the fork means and to prevent a turbulent gas flow at an exit part of the turbine.

The variable turbocharger apparatus may be one in which the piston has an end in which is mounted a conical diffuser, the conical diffuser being for facilitating gas extraction from the turbine.

The variable turbocharger may advantageously be one in which the piston includes at least one solid piston ring.

The variable turbocharger apparatus may be one in which the heat shield is clamped by clamps between the turbine housing and the bearing housing, and in which the heat shield is rotatable through 360° on loosening of the clamps thereby to enable the turbocharger apparatus to be bolted to different engines at different angles.

The variable turbocharger apparatus may be one in which the piston is mounted inside the turbine housing such that the piston slides directly over the turbine to allow a large gas exit area. This in effect means that the turbine is so constructed that it does not have a trim part.

BRIEF DESCRIPTION OF THE DRAWINGS

The present invention also extends to an engine when provided with the variable turbocharger apparatus. The engine may be any general type of engine including diesel and petrol driven engines.

Embodiments of the invention will now be described solely by way of example and with reference to the accompanying drawings in which.

DESCRIPTION OF THE PREFERRED EMBODIMENTS

Figure 1:
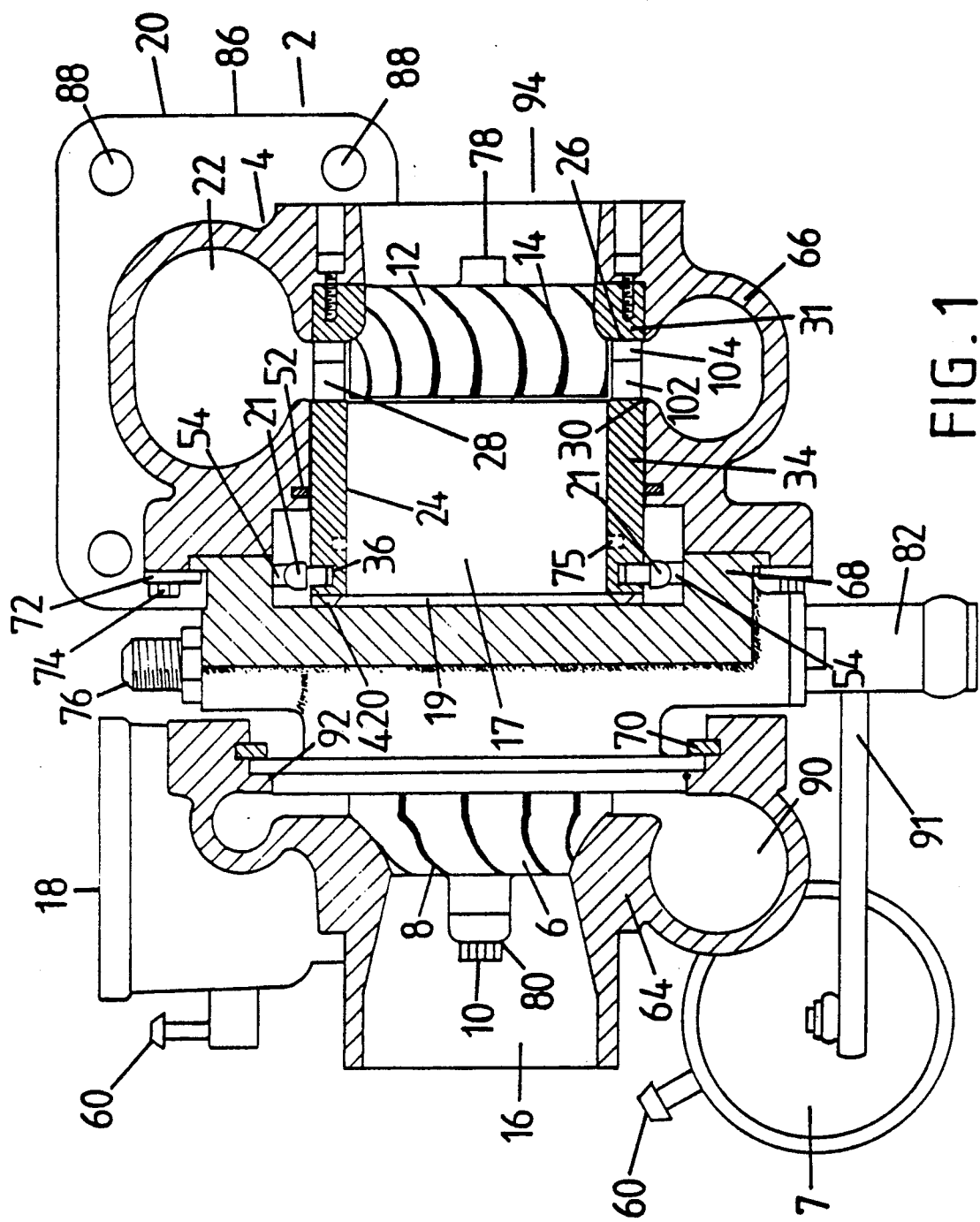
FIG. 1 is a cross section through first variable turbocharger apparatus but having a heat shield not in accordance with the invention.

Referring to FIGS. 1 to 6, there is shown first variable turbocharger apparatus 2. The variable turbocharger apparatus 2 comprises a compressor housing 64 and a compressor 6. The compressor 6 has blades 8. The compressor 6 is mounted for rotation in the housing 64 by being mounted on a central shaft 10. A turbine 12 is mounted for rotation in a turbine housing 4 by being mounted on the shaft 10. The turbine 12 has blades 14.

The housing 64 has a first inlet 16 for enabling air to be conducted to the compressor 6. The housing 64 also has an outlet 18 for air from the compressor. The outlet 18 enables air from the compressor 6 to be conducted to an engine (not shown).

The housing 4 has a second inlet 20 for enabling exhaust gases from the engine to be conducted to the turbine 12. A chamber 22 surrounds the turbine 12 and this chamber 22 receives the exhaust gases from the second inlet 20 before the exhaust gases are conducted to the turbine 12. The chamber 22 may be regarded as a volute-shaped toroidal chamber.

A piston 24 is positioned between the turbine 12 and the housing 4. The piston 24 is slidable backwards and forwards to form a movable wall separating the turbine 12 from the chamber 22 which surrounds the turbine 12.

The piston 24 is such that in its closed position it terminates short an adjacent part 26 of the housing 4 so that there is always a gap 28 between the end 30 of the piston 24 and the adjacent part 26 of the housing 4. This means that exhaust gases from the chamber 22 can always pass through the gap 28 to act on the blades 14 of the turbine 12. The piston 24 is such that in its open position, the gap 28 is increased.

The piston 24 is biased to its closed position against pressure from exhaust gases in the chamber 22 during use of the variable turbocharger apparatus 2 so that the piston 24 slides backwards and forwards to vary the gap 28 in dependence upon engine operating conditions. The piston 24 is biased by means of an actuator valve 7.

Figure 2:
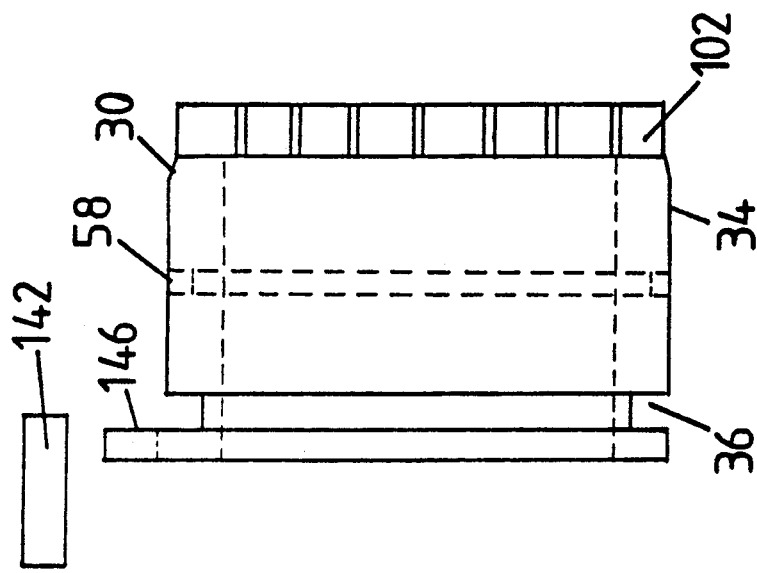
FIG. 2 is a side view of the piston shown in FIG. 1.

As can be seen from FIGS. 1 and 2, the piston 24 comprises a cylindrical body portion 34 having a groove 36 at that end of the body portion 34 remote from the gap 28.

Figure 4:
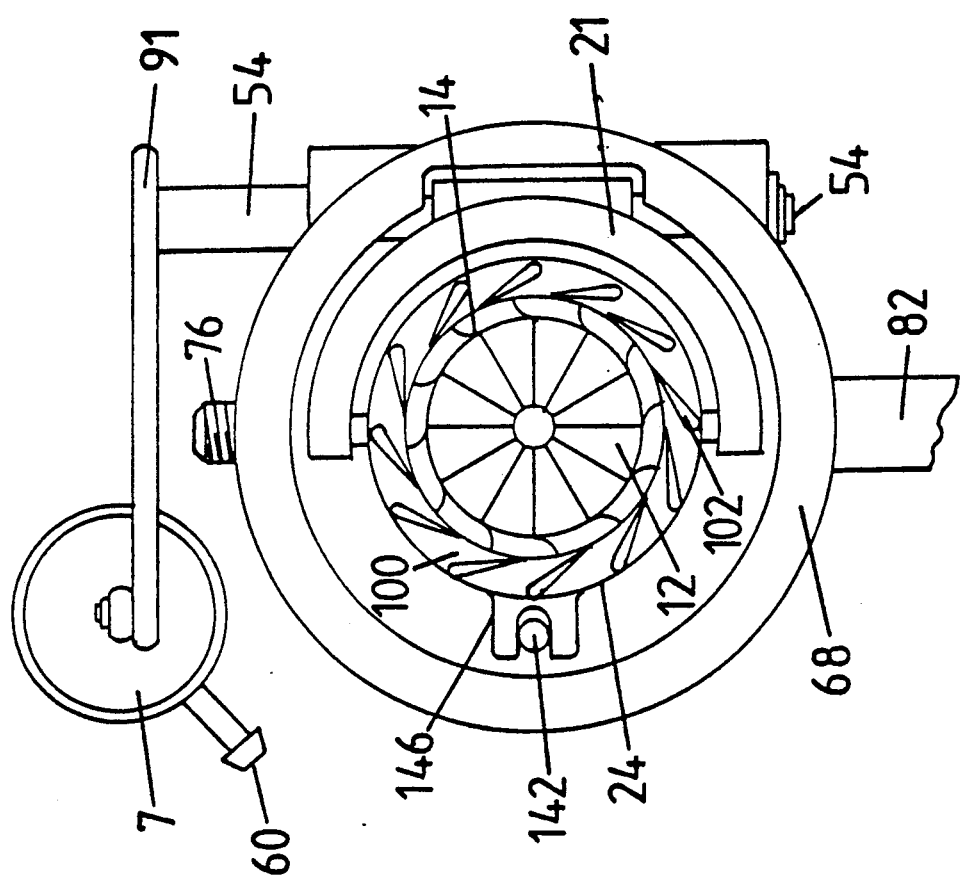
FIG. 4 is an end view of part of the first variable turbocharger apparatus.

As can best be seen from FIGS. 1 and 4, fork means in the form of a bifurcated fork 21 is located in the groove 36. The fork 21 is also fitted to a shaft 54 which can rotate in a bearing housing 68. On top of the shaft 54 is a metal bar 91 which is connected to the actuator valve 7. The actuator valve 7 thus acts as control means.

Figure 6:
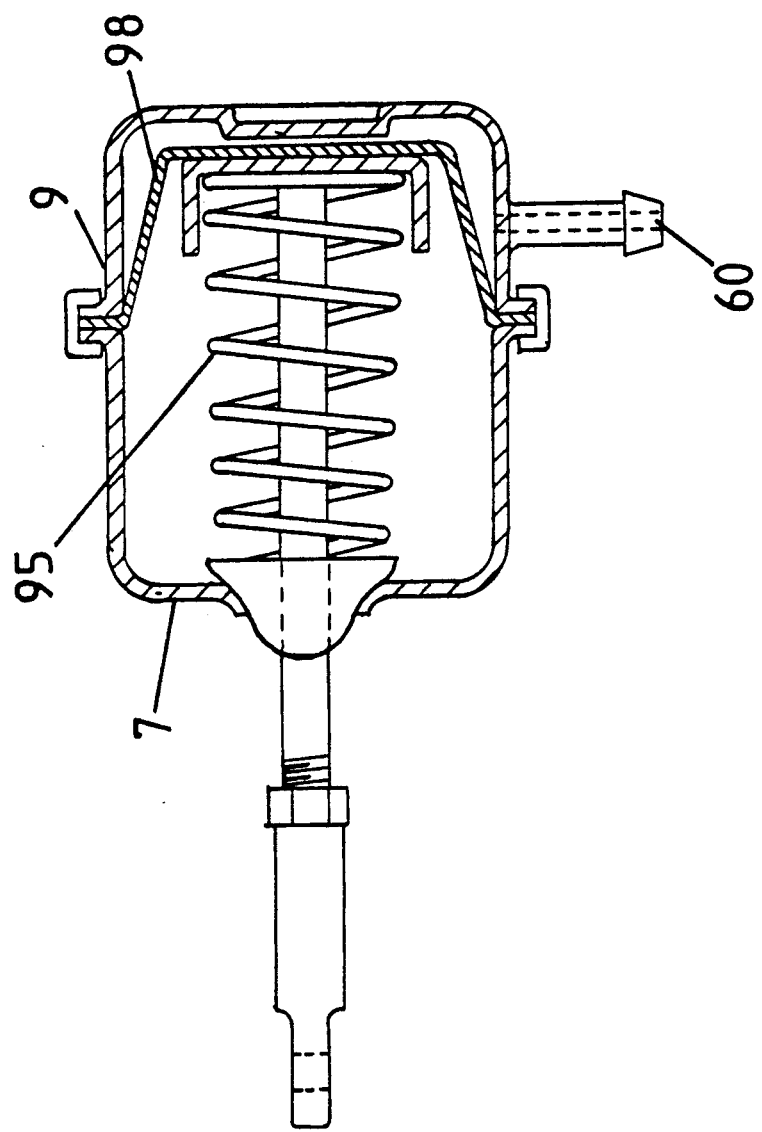
FIG. 6 is a cross section through an air actuator valve.

When the pressure starts to exceed a given level selected by the strength of a spring 95, see FIG. 6, the air pressure inside a housing 9 of the actuator valve 7 pushes a flexible diaphragm 98, thereby displacing the piston 24 to a more open position. The piston 24 acts as an area control element piston 24. The displacing of the piston 24 to a more open position in turn increases the flow area 28 and reduces the velocity of the gases entering the turbine 12.

As shown in FIGS. 1 to 6, the first variable turbocharger apparatus 2 includes sealing means in the form of a sealing piston ring 52. The sealing piston ring 52 is for forming a sliding seal between the piston 24 and the housing 4. The sealing piston ring 52 is located in the turbine housing 66. The sealing piston ring 52 can alternatively be located in the piston 24 as shown by dotted lines 58 in FIG. 2.

The end 30 of the piston 24 is chamfered as shown so that any products of combustion from the exhaust gases in the chamber 22, which may tend to build up on the part of the piston 24 forming the movable wall, may tend to break away and thus not hinder the sliding movement of the piston 24.

Figure 5:
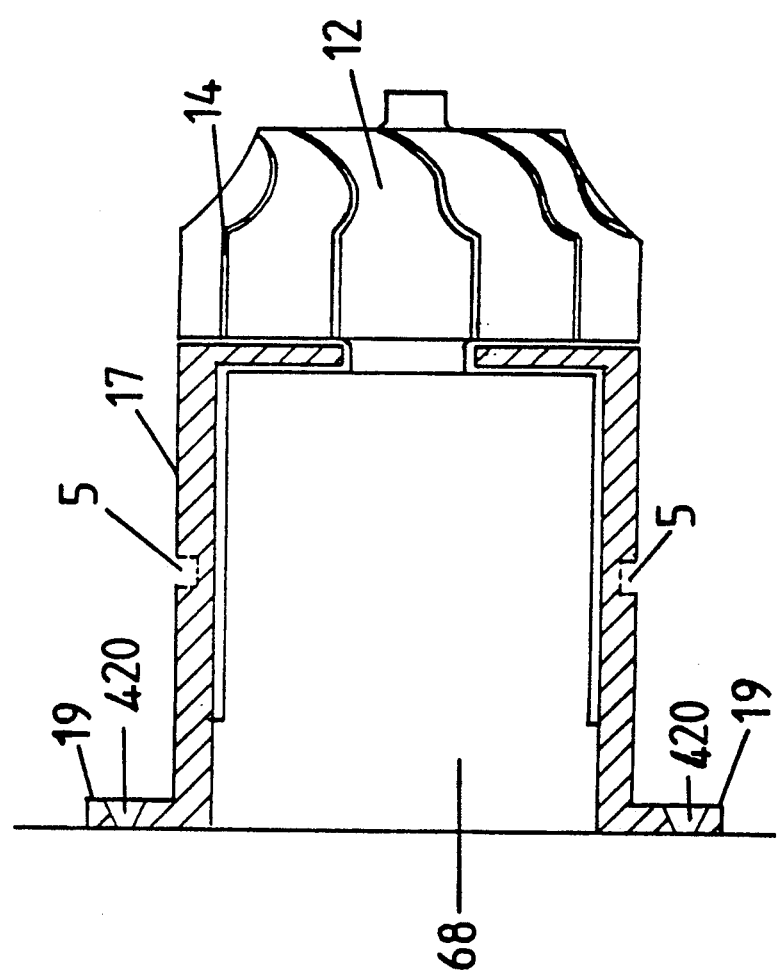
FIG. 5 is a side view of the heat shield shown in FIG. 1 and illustrates an air gap over a bearing housing.

The variable turbocharger apparatus 2 includes a heat shield 17. The heat shield 17 has a flange 19. The heat shield 17 is mounted with screws 420 over the bearing housing 68. FIG. 5 shows an air gap between the bearing housing 68 and the heat shield 17. In an alternative construction, a sealing ring may be located in the heat shield 17 as shown in FIG. 5 by dotted lines 5. In a further alternative construction, the sealing ring may be located inside the bore of the piston 24, as shown in FIG. 1 by dotted lines 75, to operate on the outside of the heat shield 17.

An advantageous feature of the first variable turbocharger apparatus shown in FIGS. 1 to 6 is that the housing 4 is separable into two end parts 64,66 and a central part 68. This may facilitate positioning of the variable turbocharger apparatus 2 in various required positions in various engine compartments in vehicles or in other apparatus. The end part 64 is secured to the central part 68 by means of a cir-clip 70. The end part 66 is secured to the central part 68 by locking washers 72 which are held in position by bolts 74. The end part 64 forms a compressor housing, the end part 66 forms a turbine housing, and the central part 68 forms a bearing housing.

The variable turbocharger apparatus 2 is also provided with an oil intake pipe 76 for providing oil for bearings (not shown) on the shaft 10. The shaft 10 is formed with a friction welded head 78 at one end. The other end of the shaft 10 is screw threaded as shown to receive a nut 80, which is effective to hold the compressor 6 in position. An oil return pipe 82 is also provided for enabling the oil provided for the bearings via the oil intake pipe 76 to drain away.

The second inlet 20 is provided with a flange 86. The flange 86 has bolt holes 88 so that the flange 86 can be bolted to an exhaust outlet (not shown) of the engine.

The compressor 6 is surrounded by a chamber 90 which is somewhat similar to the chamber 22. In order to prevent the loss of air from the chamber 90 as the air passes to the outlet 18, a seal in the form of an O-ring seal 92 is provided as shown.

By being able to vary the size of the gap 28, the exhaust gases from the engine are able to drive the turbine 12 at substantially always the required rate to enable the compressor 6 to provide the amount of air required by the engine from the variable turbocharger apparatus 2, via the outlet 18.

The bleeding of air along the air bleed passage 60 is effective to act on the actuator valve 7 to cause the piston 24 to slide towards its open position in which the size of the gap 28 is increased. After the exhaust gases have driven the turbine 12, they are exhausted via an exhaust outlet 94 formed in the housing 4.

As shown in FIG. 2, the piston 24 is provided with an annular groove, shown by the dotted lines 58, for receiving the sealing piston ring 52. Alternatively, the sealing piston ring 52 may be located in the housing 4 as shown in FIG. 1. Also shown in FIG. 2, is the groove 36 for receiving the fork 21.

Figure 3:
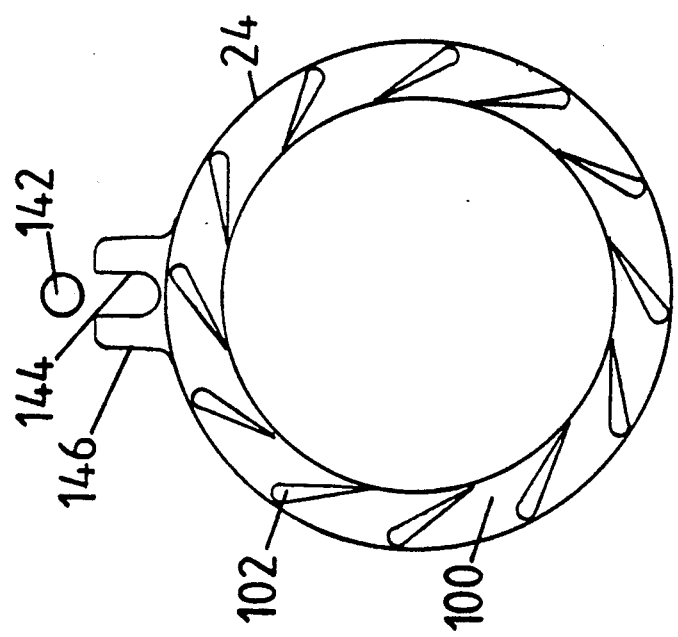
FIG. 3 is an end view of the piston shown in FIG. 2.

FIGS. 2, 3 and 4 show that on the piston 24 there is a lug 146 which may have a slot 144 as shown, or a hole (not shown), for location on to a pin 142. The pin 142 may be mounted in the bearing housing 68 as shown, or alternatively in the turbine housing 66. The pin 142 and the lug 146 are provided to prevent rotation of the piston 24.

As shown in FIG. 3, the piston 24 is such that the face 100 of the end 30 is provided with vanes 102. The vanes 102 are oriented so that they direct the incoming gas flow in a tangential direction to provide the appropriate gas flow. The vanes 102 are cut or otherwise provided in the end 30 of the piston 24. Vanes 104 are also provided in the turbine housing 66, the vanes 104 being provided in the form of an insert 31 as shown in FIG. 1. Alternatively, the vanes 104 may be cast into the turbine housing 66. The angular positions of the vanes 102,104 in the turbine housing 66 and the piston 24 are such that the vanes 102 on the piston 24 are interposed with the vanes 104 in the turbine housing 66. Relative displacement of the piston 24 varies the extent of overlap of the vanes 102,104.

Figure 7:
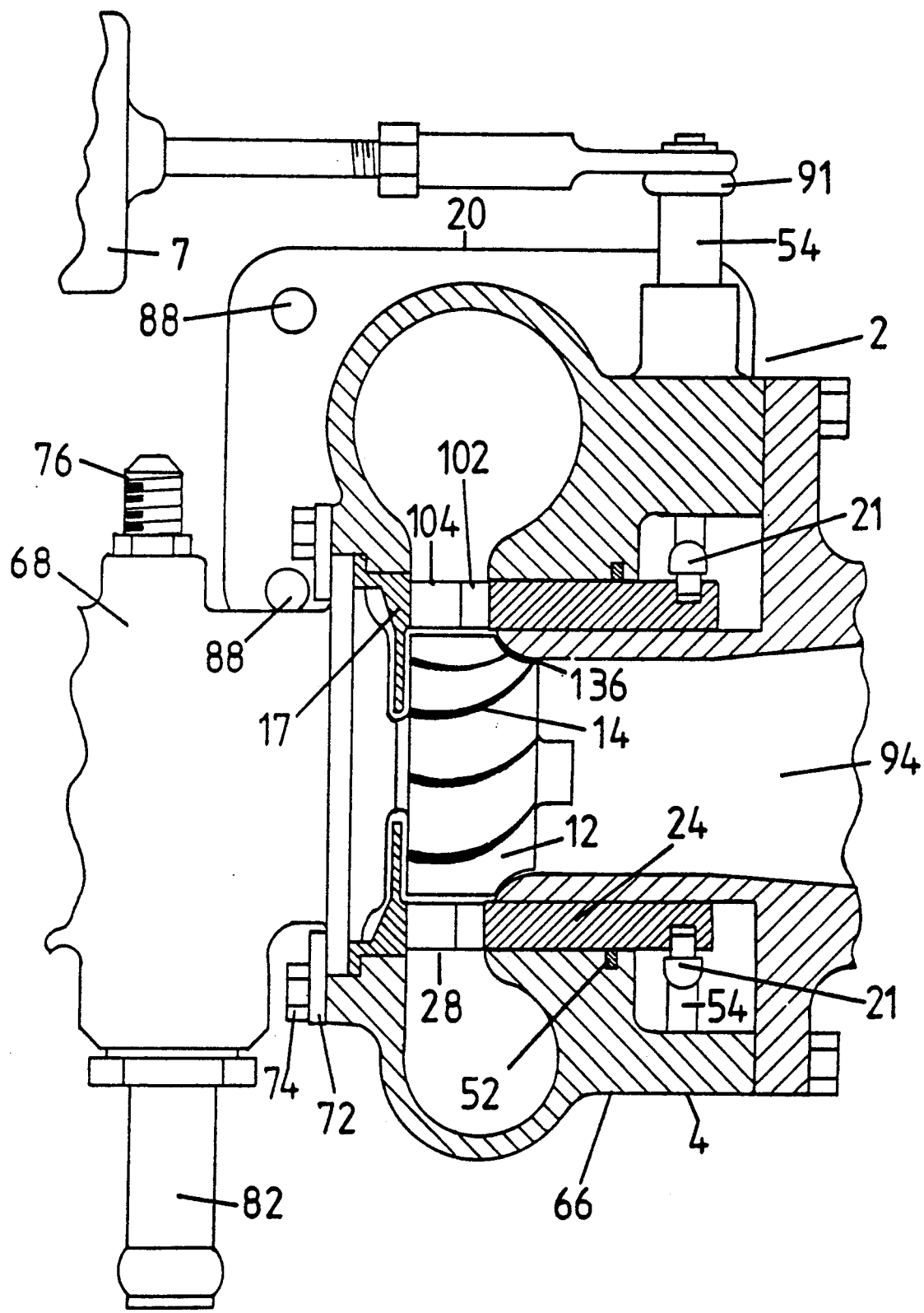
FIG. 7 is a cross section through second variable turbocharger apparatus.

Referring to FIG. 7, there is shown second variable turbocharger apparatus in which similar parts as in FIG. 1 have been given the same reference numerals and will not again be described. In FIG. 7, the relative positions of the fork 21 and the piston 24 have been changed so that the piston 24 operates in the opposite direction to that shown in FIG. 1.

Figure 12:
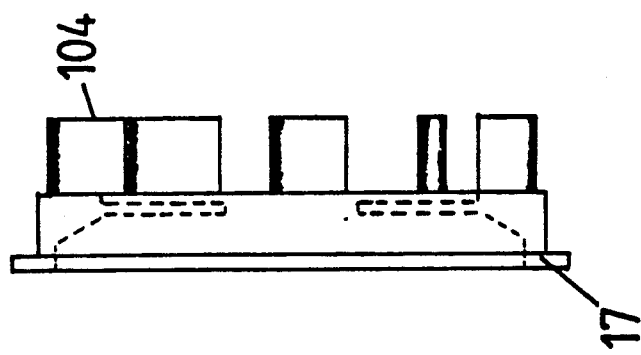
FIG. 12 is a side view of the heat shield shown in FIG. 11.
Figure 11:
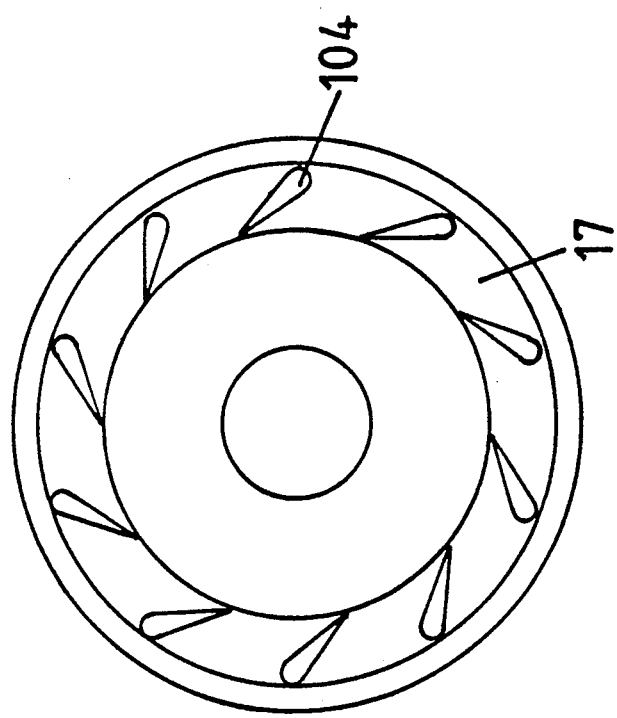
FIG. 11 is an end view of a heat shield provided with vanes, the heat shield being of the type not required by the present invention.

FIG. 7 also shows how the heat shield 17 is used as an insert to hold the vanes 104. The insert is also shown in FIG. 11 and FIG. 12. FIGS. 11 and 12 show respectively an end view and a side view of the heat shield 17, provided with the vanes 104.

Figure 8:
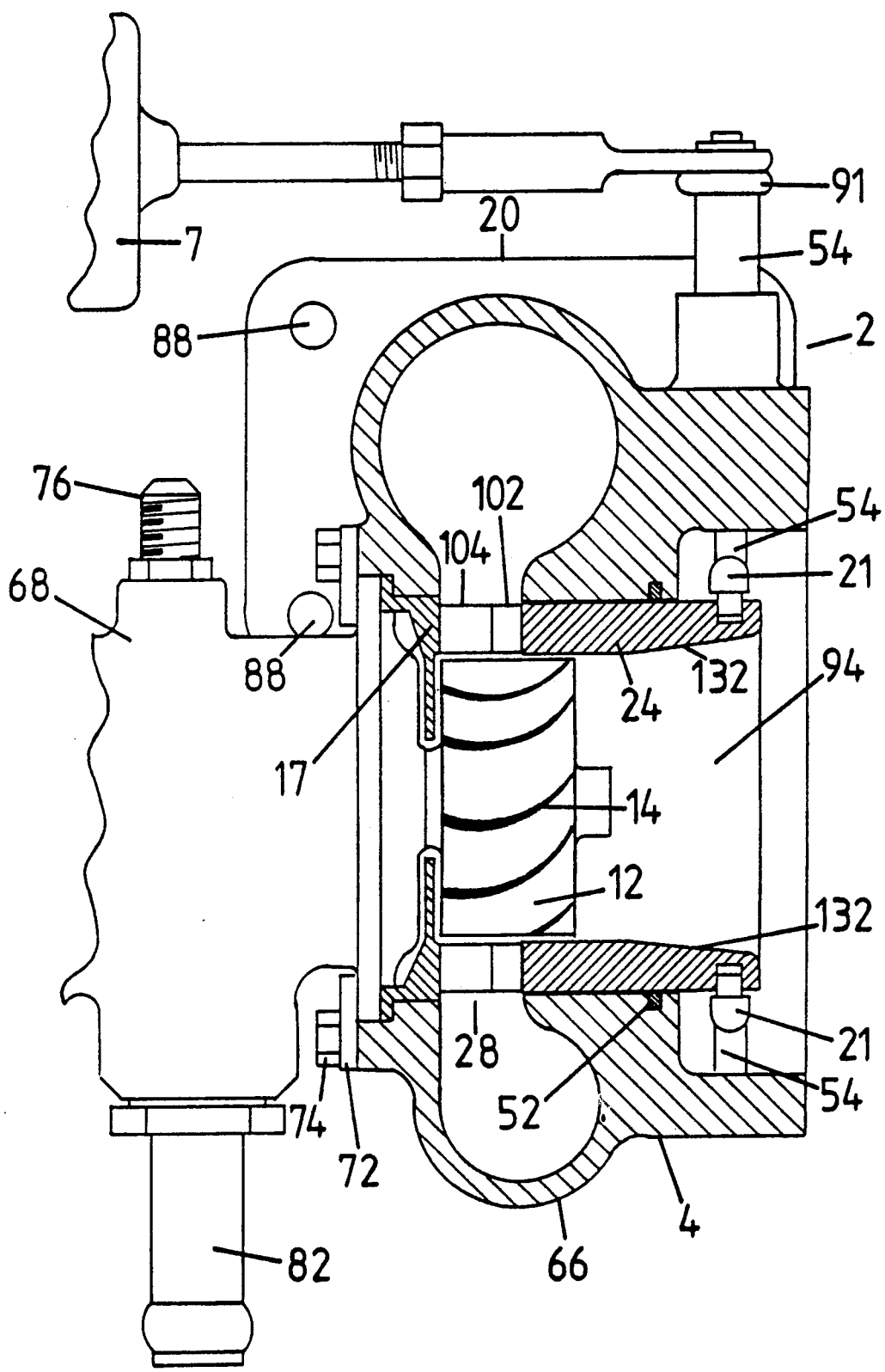
FIG. 8 is a cross section through third variable turbocharger apparatus.

Referring to FIG. 8, there is shown third variable turbocharger apparatus in which similar parts as in FIG. 7 have been given the same reference numerals and will not again be described. In FIG. 8, a trim 136 as shown in FIG. 7 on the turbine 12 has been removed. This is to allow a larger exit area from the turbine 12. The piston 24 is slightly different in that the piston 24 terminates in a conical diffuser 132.

Figure 9:
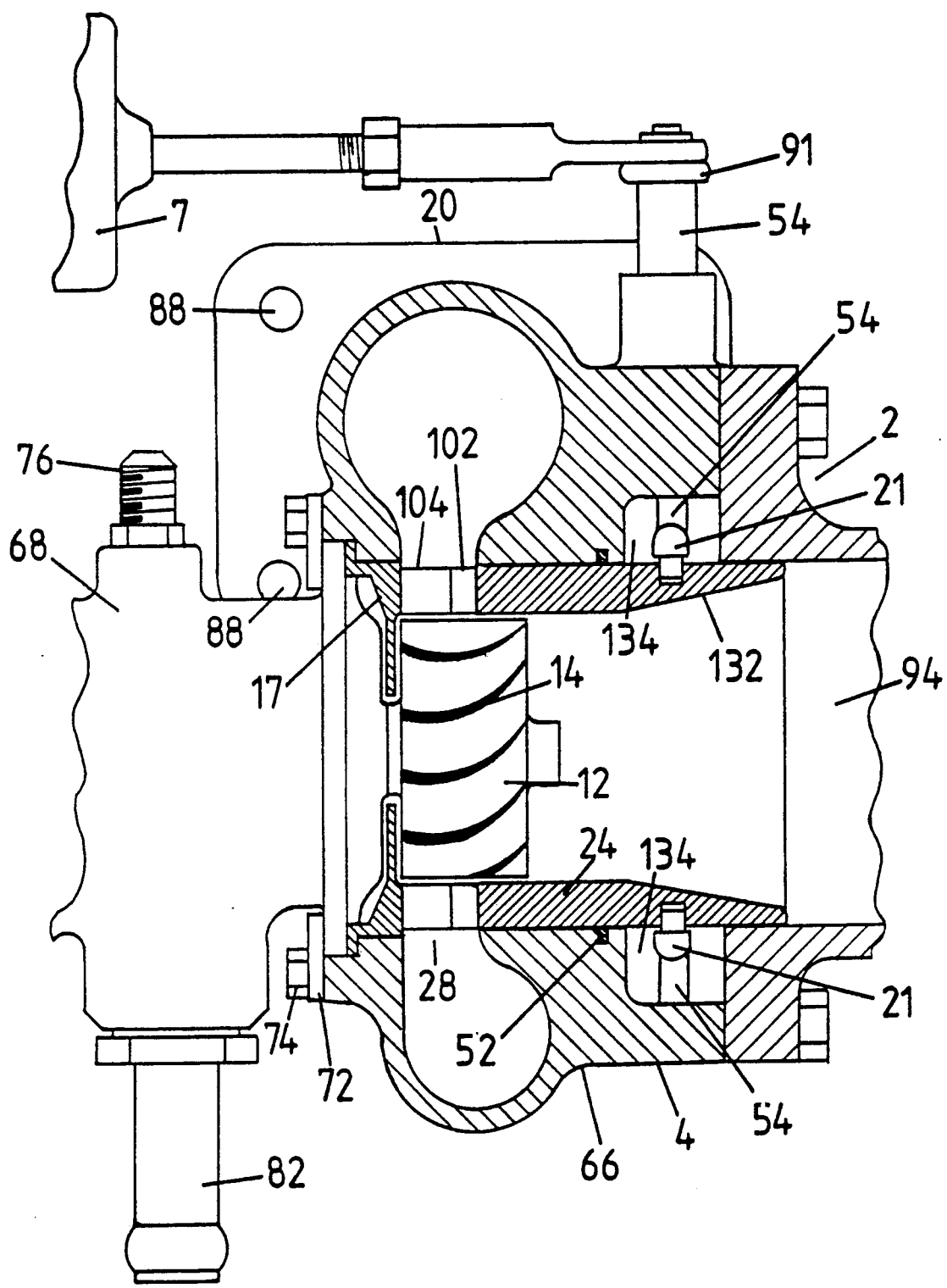
FIG. 9 is a cross section through fourth variable turbocharger apparatus.

FIG. 9 shows fourth variable turbocharger apparatus 2 which is similar to the variable turbocharger apparatus 2 shown in FIG. 8 but which employs a longer piston 24 to prevent gases building up in an area 134. Also, turbulent gas flow in the area 134 and turbulent gas flow leading to the outlet of the variable turbocharger apparatus 2 is avoided or reduced. The longer piston 24 of FIG. 9 also has the conical diffuser 132.

Figure 10:
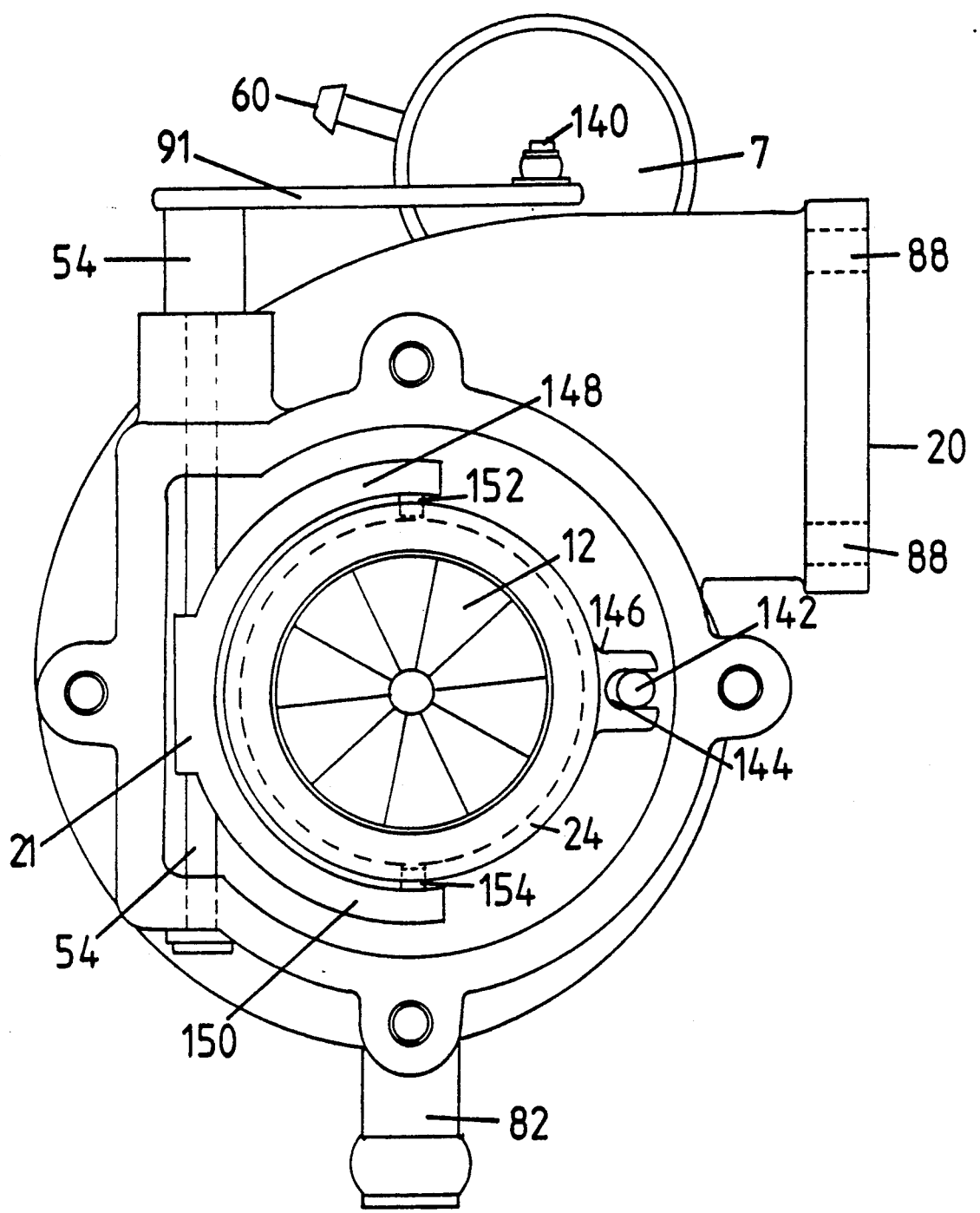
FIG. 10 is an end view of the second, third and fourth variable turbocharger apparatus shown in FIGS. 7, 8 and 9.

Referring now to FIG. 10, there is shown an end view of turbocharger apparatus 2 which may be the variable turbocharger apparatus 2 shown in either of FIGS. 7, 8 or 9. Again similar parts as in the previous Figures have been given the same reference numerals and their precise construction and operation will not again be given. In FIG. 10, there is shown a control arm 91 which terminates in a connection member 140 for connecting to the actuator valve 7. As indicated above, the actuator valve 7 takes pressure from the compressor side of the turbine 12. Alternatively, the pressure may be taken from an engine management system (not shown). FIG. 10 also shows a pin 142 which locates in an aperture 144 in a lug 146 formed on the piston 24. The pin 142 acts to stop rotation of the piston 24 during the backwards and forwards sliding movement of the piston 24. The piston 24, the pin 142, the aperture 144 and the lug 146 are shown in more detail in FIGS. 2 and 3.

FIG. 10 further shows how the fork 21 has two arms 148, 150. The arm 148 has a pin 152 and the arm 150 has a pin 154. The pins 152, 154 locate in the groove 36 and thus enable the piston 24 to be moved backwards and forwards without putting undue sideways pressure on the piston 24 which could move it out of axial sliding alignment and could thus cause the piston 24 to bind. The fork 21 is attached to a rod 54 which is mounted in the turbine housing 66. The rod 54 connects to the control arm 91 as shown.

Figure 13:
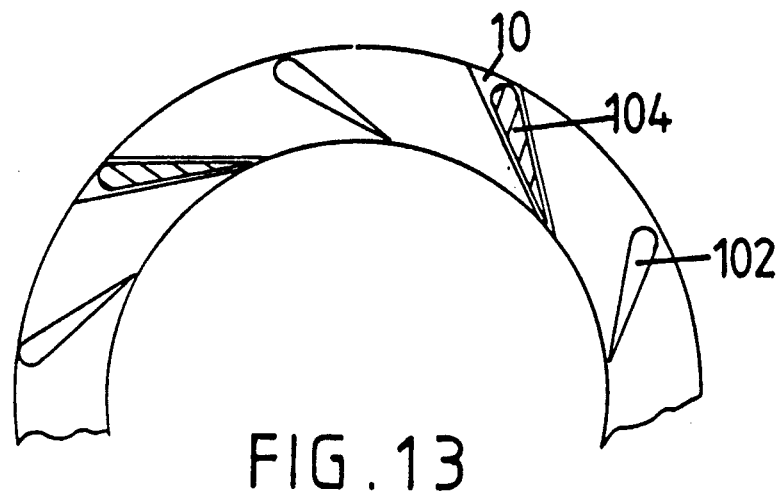
FIG. 13 illustrates how the vanes enter slots.
Figure 14:
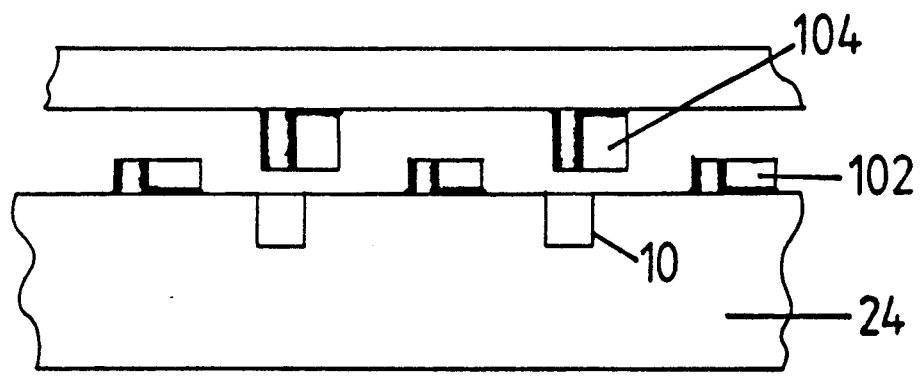
FIG. 14 is a side view showing a vane arrangement in an open position.
Figure 15:
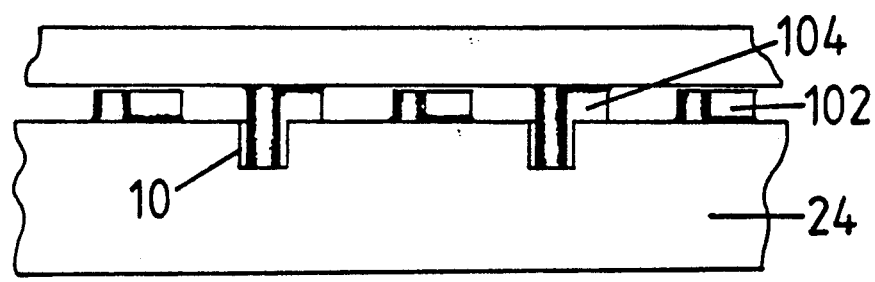
FIG. 15 is a side view showing the vane arrangement of FIG. 14 in a closed position.

In FIGS. 1, 7, 8 and 9 described above, co-operating vanes 102, 104 are shown. In FIGS. 13, 14 and 15, there is shown a vane arrangement in which the piston 24 is modified so that slots 10 are provided between the vanes 102 on the piston 24. These slots 10 have the advantage that they allow the gap 28 between the piston 24 and the housing 4 to be closed down more than 50%, whilst maintaining the vanes 102 on the piston 24 and the housing 4 in an overlapping manner in the open position of the piston 24. If the piston 24 is in an open position and the vanes 102, 104 are not in an overlapping manner, then the vanes 102, 104 are not able to direct all the available gases at the appropriate angle on to the turbine 12, and a turbulent gas flow may result. By utilizing the slots 10 shown in FIGS. 13,14 and 15, this turbulence may be prevented, thus avoiding a decrease in efficiency due to the turbulent gas flow.

In FIGS. 13, 14 and 15, the slots 10 are provided in the piston 24. The slots 10 receive the vanes 104 and the vanes 104 may extend from an insert. The reverse arrangement may be employed in which the slots are in the insert, and in which the vanes 104 for the slots then project from the piston 24. The slots may be cast in the turbocharger apparatus housing.

In further modifications of the variable turbocharger apparatus 2, the slots 10 may be omitted. The slots that may be omitted may thus be in the piston 24 or in the insert 31.

The above described variable turbocharger apparatus employs sealing means in the form of a sealing piston ring 52. The sealing means may be a sealing ring other than a split piston ring. Where a split piston ring is employed, this may be inwardly sprung to bear against the outer surface of the piston 24 in order to effect the required seal against gases. Such a split piston ring 52 will rub on the surface of the piston 24 and thus some friction will be created. Whilst this is satisfactory in many circumstances, if it is desired to reduce or obviate this friction, then a solid piston ring may be employed. Because this solid piston ring does not have a split in it, it is not inwardly sprung and thus friction is reduced.

In addition, as the variable turbocharger apparatus operates, exhaust gases will be contacting the piston ring. With a split piston ring, these exhaust gases may cause the split piston ring to operate with a hammering effect on the surface of the piston 24, and this can be disadvantageous and can cause undesirable wear on the surface of the piston 24. The use of the solid piston ring may help to avoid this hammering effect and may thus again reduce undesirable wear on the surface of the piston 24.

Irrespective of whether a split piston ring or a solid piston ring is employed, it may be advantageous to produce the piston ring from a material which has substantially the same rate of expansion as the material from which the piston 24 is produced. Thus, as the piston 24 and the piston ring become hot during operation of the variable turbocharger apparatus, the piston 24 and the piston ring can expand at substantially the same rate to avoid creating unnecessary friction as might be the case if the piston 24 expanded more than the piston ring. The piston 24 and the piston ring can be made of the same or different materials.

Figure 16:
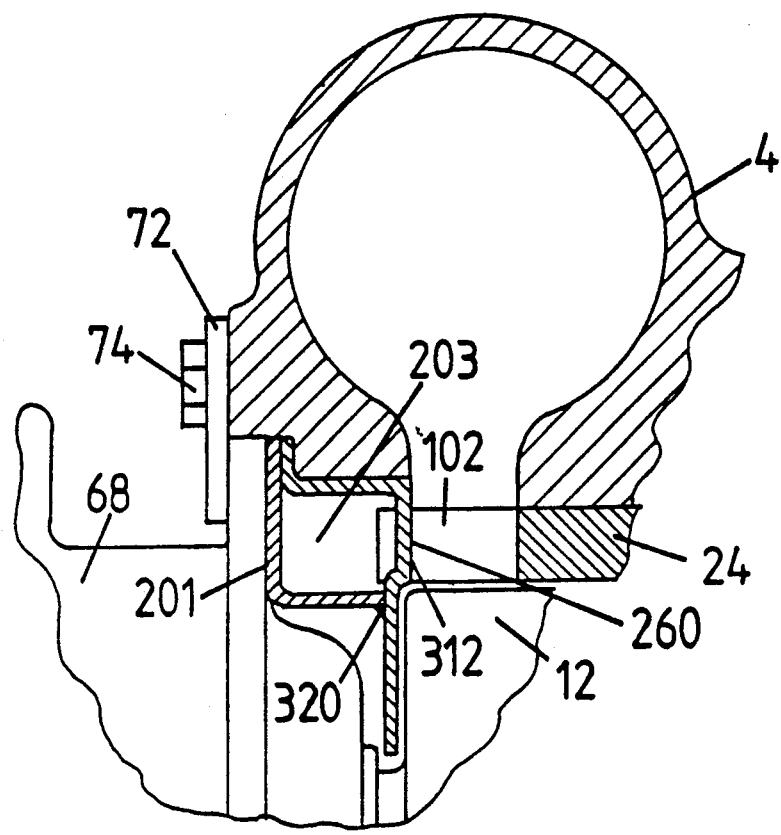
FIG. 16 is a cross sectional view showing a heat shield of the type required by the present invention, and a vane arrangement in an open position.
Figure 17:
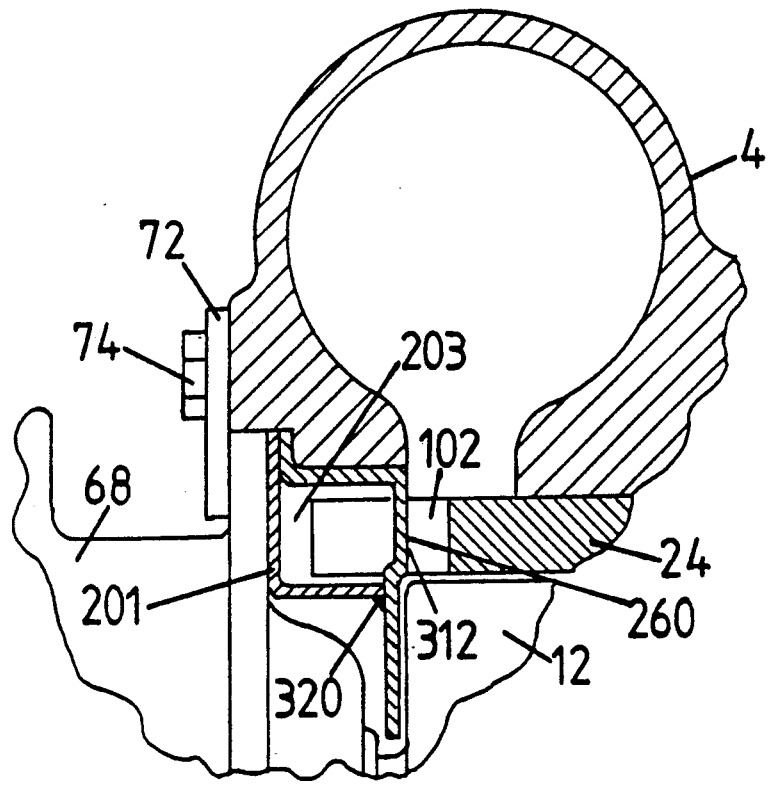
FIG. 17 is a cross sectional view like that shown in FIG. 16 but with the vane arrangement in a closed position.

In FIGS. 16 and 17 a second vane arrangement is shown in which the heat shield 17 is replaced by a heat shield 201. The heat shield 201 has a chamber 203 at the back of the heat shield 201. On a face 312, there are slots 260 provided in the heat shield 201, so as to allow the vanes 102 on the piston 24 to enter the chamber 203. In order to prevent gases leaking past the chamber 203, the chamber 203 is preferably a sealed unit along a face 320.

Figure 18:
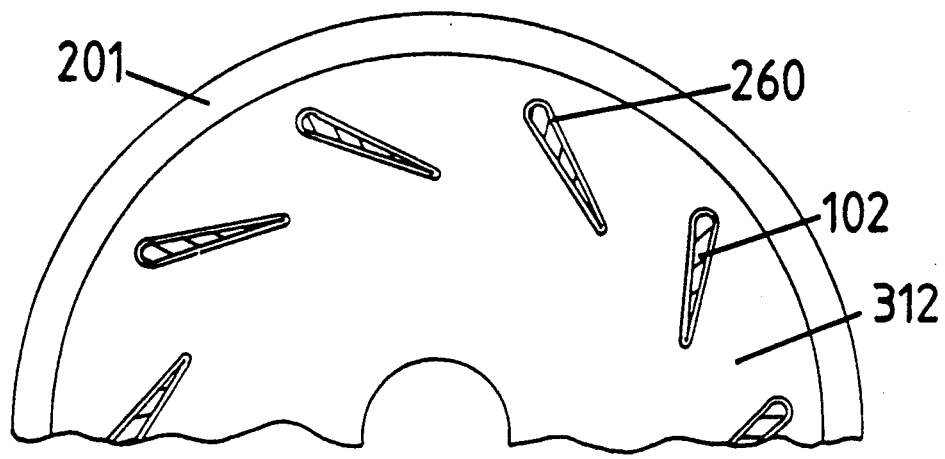
FIG. 18 is an end view of the vane arrangement shown in FIGS. 16 and 17.
Figure 19:
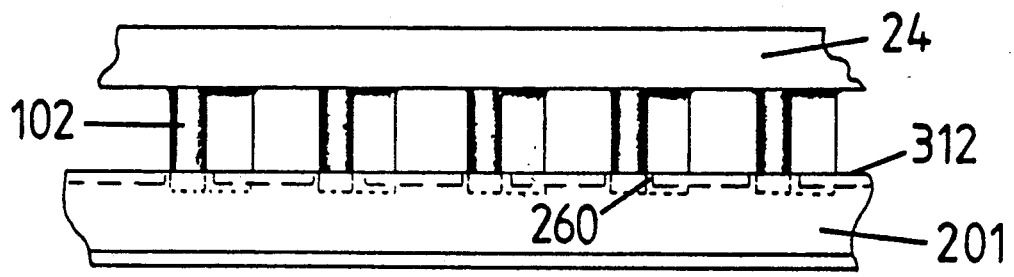
FIG. 19 is a side view of the vane arrangement of FIGS. 16–18 and in an open position.
Figure 20:
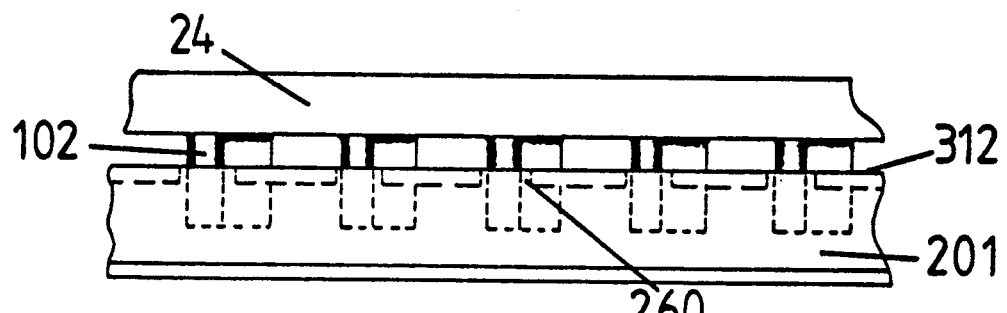
FIG. 20 is a side view of the vane arrangement of FIGS. 16–18 and in a closed position.

FIGS. 18, 19 and 20 illustrate the heat shield 201. FIG. 18 is an end view which shows the heat shield 201 with the vanes 102 entering slots 260 in the heat shield 201. FIG. 19 shows the vanes 102 in the open position, whilst FIG. 20 shows the vanes 102 in the closed position. The movement of the piston 24 on this second vane arrangement is the same as described above with reference to FIGS. 7, 8 and 9.

The turbocharger apparatus shown in FIGS. 16 to 20 gives the following advantages.

1. The vanes 102 are always in the gas flow, so the gases will always be guided at the most efficient angle to the turbine 12 throughout the full operating range of the turbocharger apparatus.

2. With the sealed chamber 203, the gases are prevented from leaking by the heat shield 201 into the low pressure side of the turbocharger apparatus, so all of the gases have to work on the turbine 12 which gives greater efficiency.

3. With the sealed chamber 203, the heat shield 201 has two layers of protection to prevent heat from working on the back face of the bearing housing 68. The two layers of protection are formed by two adjacent sides of the sealed chamber 203.

4. With the heat shield 201, the bearing housing 68 and the turbine housing 4 are rotatable independently of each other, so the turbocharger apparatus can be bolted to different engines with substantially equal ease and engine components that might have been in the way can easily be avoided by simply relatively rotating the bearing housing 68 and the turbine housing 4.

5. With the heat shield 201, the bearing housing 68 and the turbine housing 4 are rotatable so that the oil outlet 82 can always be arranged to point vertically downwards, thus giving a good gravity feed of oil back to the engine.

It is to be appreciated that the embodiments of the invention described above with reference to the accompanying drawings have been given by way of example only and that modification may be effected. Thus, for example, the vanes 102, 104 may take a different shape to those shown, and more or less vanes than those shown may be employed. If desired, the vanes may be reversed to allow a reverse rotation of the turbine 12.

The variable turbocharger apparatus 2 may be produced in various sizes commensurate with the size of engine to which the variable turbocharger apparatus 2 is to be fitted. The shape of the housing 4 can be varied as may be desired. Water cooled bearings may be incorporated. The housing 4 and the various components within the housing 4 can be made of any desired and suitable materials. Also, sealing rings may be added or dispensed with as desired.

I claim:

1. Variable turbocharger apparatus comprising a compressor housing, a compressor mounted for rotation in the compressor housing, a turbine housing, a turbine mounted for rotation in the turbine housing, a first inlet for enabling air to be conducted to the compressor, an outlet for air from the compressor, a second inlet for enabling exhaust gases from an engine to be conducted to the turbine, a chamber which surrounds the turbine and which receives the exhaust gases from the second inlet before the exhaust gases are conducted to the turbine, a piston which is positioned between the turbine and the turbine housing and which is slidable backwards and forwards to form a movable wall separating the turbine from the chamber which surrounds the turbine, a bearing assembly for allowing the rotation of the compressor and the turbine, and a heat shield for shielding the bearing assembly from the exhaust gases, the piston having a plurality of vanes, the piston being such that in its closed position it terminates short of an adjacent part of the turbine housing so that there is always a gap between the end of the piston and the adjacent part of the turbine housing whereby exhaust gases from the chamber can always pass through the gap to act on the turbine, the piston being such that in its open position the gap is increased, and the piston being biased to its closed position against pressure from exhaust gases in the chamber during use of the variable turbocharger apparatus whereby the piston slides backwards and forwards to vary the gap in dependence upon engine operating conditions, and the variable turbocharger apparatus being such that the vanes on the piston enter into slots in the heat shield.

2. Variable turbocharger apparatus according to claim 1 in which the heat shield forms a chamber into which the vanes on the piston project, the chamber being sealed so as to prevent gas leakage to a low pressure side of the turbine.

3. Variable turbocharger apparatus according to claim 1 and including fork means which engages in a groove in the piston.

4. Turbocharger apparatus according to claim 3 in which the fork means is located on a shaft which is mounted in the turbine housing.

5. Variable turbocharger apparatus according to claim 4 in which the shaft is connected to an actuator valve.

6. Variable turbocharger apparatus according to claim 3 in which the piston is provided with a lug which engages a pin for preventing rotation of the piston.

7. Variable turbocharger apparatus according to claim 3 and including a chamber in which the fork means locates, the piston being such as to cover the chamber to prevent a heat build-up on the fork means and to prevent a turbulent gas flow at an exit part of the turbine.

8. Variable turbocharger apparatus according to claim 1 in which the piston has an end in which is mounted a conical diffuser, the conical diffuser being for facilitating gas extraction from the turbine.

9. Variable turbocharger apparatus according to claim 1 in which the piston includes at least one solid piston ring.

10. Variable turbocharger apparatus according to claim 1 in which the piston is mounted inside the turbine housing such that the piston slides directly over the turbine to allow a large gas exit area.

11. Variable turbocharger apparatus according to claim 1 in which the heat shield is clamped by clamps between the turbine housing and the bearing housing, and in which the heat shield is rotatable through 360° on loosening of the clamps thereby to enable the turbocharger apparatus to be bolted to different engines at different angles.

* * * * *